United States Patent
Li et al.

(10) Patent No.: US 12,118,771 B2
(45) Date of Patent: Oct. 15, 2024

(54) METHOD AND SYSTEM FOR PROCESSING IMAGE, DEVICE AND MEDIUM

(71) Applicant: SUZHOU METABRAIN INTELLIGENT TECHNOLOGY CO., LTD., Jiangsu (CN)

(72) Inventors: Feng Li, Jiangsu (CN); Zhenzhen Zhou, Jiangsu (CN); Xiaolan Zhang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/564,457

(22) PCT Filed: Mar. 29, 2022

(86) PCT No.: PCT/CN2022/083740
§ 371 (c)(1),
(2) Date: Nov. 27, 2023

(87) PCT Pub. No.: WO2023/087597
PCT Pub. Date: May 25, 2023

(65) Prior Publication Data
US 2024/0249508 A1    Jul. 25, 2024

(30) Foreign Application Priority Data
Nov. 19, 2021 (CN) .......................... 202111383898.1

(51) Int. Cl.
*G06V 10/82* (2022.01)
*G06V 10/26* (2022.01)
*G06V 10/774* (2022.01)

(52) U.S. Cl.
CPC ............ *G06V 10/774* (2022.01); *G06V 10/26* (2022.01); *G06V 10/82* (2022.01)

(58) Field of Classification Search
CPC ....... G06V 10/774; G06V 10/26; G06V 10/82
(Continued)

(56) References Cited

U.S. PATENT DOCUMENTS

| | | | | |
|---|---|---|---|---|
| 2015/0262116 | A1* | 9/2015 | Katircioglu | G06Q 10/087 705/28 |
| 2019/0236738 | A1* | 8/2019 | Lebel | G06F 18/214 |

(Continued)

FOREIGN PATENT DOCUMENTS

| | | |
|---|---|---|
| CN | 110188817 A | 8/2019 |
| CN | 110660066 A | 1/2020 |

(Continued)

OTHER PUBLICATIONS

Chinese Search Report received for CN Application No. 2021113838981 on Dec. 24, 2021, 4 pgs.

(Continued)

*Primary Examiner* — Ali Bayat
(74) *Attorney, Agent, or Firm* — Merchant & Gould P.C.

(57) ABSTRACT

A method and system for processing image, a computer device and a readable storage medium. The method includes: images in an initial dataset are preprocessed to obtain a training dataset (S1); an image segmentation neural network is trained by the training dataset (S2); a last loss function layer of a trained image segmentation neural network is removed to obtain an inference network (S3); the training dataset is inputted into the inference network to obtain a plurality of logical vectors (S4); a check network is trained on a basis of the plurality of the logical vectors, the initial dataset, and a mask of each of the images in the initial dataset (S5); and inference is performed on an image to be processed by the inference network and a trained check network so as to obtain the mask of the image to be processed (S6).

20 Claims, 4 Drawing Sheets

(58) Field of Classification Search
USPC ......................................................... 382/157
See application file for complete search history.

(56) References Cited

U.S. PATENT DOCUMENTS

| | | | |
|---|---|---|---|
| 2020/0065968 A1 | 2/2020 | Sargent | |
| 2020/0357143 A1 | 11/2020 | Chiu | |
| 2021/0049473 A1* | 2/2021 | Balachandar | G06F 18/285 |
| 2021/0158108 A1* | 5/2021 | Ando | G06V 20/56 |
| 2022/0357415 A1* | 11/2022 | Wu | G01R 33/5608 |
| 2022/0358359 A1* | 11/2022 | Huang | G06T 7/50 |
| 2023/0041290 A1* | 2/2023 | Cooper | G06N 3/04 |

FOREIGN PATENT DOCUMENTS

| | | |
|---|---|---|
| CN | 111028244 A | 4/2020 |
| CN | 111259905 A | 6/2020 |
| CN | 112001401 A | 11/2020 |
| CN | 112001932 A | 11/2020 |
| CN | 112288074 A | 1/2021 |
| CN | 112580647 A | 3/2021 |
| CN | 113361373 A | 9/2021 |
| CN | 113822287 A | 12/2021 |
| WO | 2020222985 A1 | 2/2022 |

OTHER PUBLICATIONS

Wang, Yong, et al., "Classification of High Resolution Satellite Images Using Improved U-Net", Int. J. Appl. Math. Comput. Sci., 2020, vol. 30, No. 3, 399-413, DOI: 10.34768/amcs-2020-0030, 15 pgs.

Chai, Zhilei, et al., "Research and Implementation of FPGA-based . . . ", FPGA C028-222, Jan. 15, 2021, 66 pgs.

International Search Report & Written Opinion for PCT International Serial No. PCT/CN2022/083740 on Jul. 27, 2022, 14 pgs.

Wen, Peizhi, et al., "Improved Image Automatic Segmentation Method Based on Convolution Neural Network", Application Research of Computers, vol. 35, No. 9, Sep. 30, 2017, ISSN: 1001-3695, 5 pgs.

Chen, Tianhua, et al., "Remote Sensing Image Segmentation Based on Improved Deeplab Network", Measurement & Control Technology, vol. 37, No. 11, Nov. 30, 2018, ISSN: 1000-8829, 6 pgs.

* cited by examiner

METHOD AND SYSTEM FOR PROCESSING IMAGE, DEVICE AND MEDIUM

CROSS-REFERENCE TO RELATED APPLICATION

The present application is a National Stage Application of PCT International Application No.: PCT/CN2022/083740 filed on Mar. 29, 2022, which claims priority to Chinese patent application no. 202111383898.1, filed with the Chinese National Intellectual Property Administration on Nov. 19, 2021, the disclosure of which is incorporated herein by reference in its entirety.

TECHNICAL FIELD

The present disclosure relates to the field of image processing, and in particular, to a method and system for processing image, a device and a storage medium.

BACKGROUND

At present, artificial intelligence technology develops vigorously, and is widely applied to a plurality of technical fields, such as intelligent transportation, smart medical care, automatic driving, object recognition from pictures, recommendation system, voice recognition and machine translation, thereby bringing about a new round of social transformation. The latest research orientation of artificial intelligence technology is exactly the deep learning technology. Deep learning is a complex machine learning algorithm for learning an inherent law and representation hierarchy of data, and can deeply parse implicit information of image data, text data and voice signals, which also means having higher computation amount, and therefore when ultra-large-scale data is processed, the computation amount is too large and the computation time is long, for example, in the cases of medical data requiring ultra-high-resolution images, satellite remote sensing data, 3D cloud atlas and city road map, and the direct application to the deep learning algorithm obviously leads to video memory soaring or even overflow. In order to solve this problem, in the past deep learning technology, images are often compressed, and then subsequent training and reasoning processes are performed by a deep learning algorithm, which leads to inaccurate recognition of dense images in segmentation tasks by a neural network, and difficulty in defining edge parts of different categories.

With regard to different tasks in the field of computer vision, starting from feature pyramid networks (FPN) for fusion of multi-scale feature information proposed for the first time, to subsequent atrous spatial pyramid pooling (ASPP) for sampling of a given input by parallel atrous convolutions with different sampling rates, fusing multilayer feature information of objects becomes a mainstream solution, and this solution can effectively improve evaluation indexes of target detection and instance segmentation.

Another solution is that, by means of a data enhancement method, small targets or targets with fewer categories are replicated, and together with technologies such as rotation and zoom, the number and types of unbalanced targets are violently increased.

However, the existing solution based on algorithm optimization can improve the effect of small target recognition, but has a high requirement for the computation amount. It has been proved from the previous practice that this step often becomes a computation bottleneck of the whole algorithm. The premise of adopting the data enhancement method is that the size of the data and the size of the network can match the computation capability of the training platform, and when encountering ultra-large-scale data, the data enhancement method cannot be used, which even leads to a larger computation pressure.

SUMMARY

The embodiments of the present disclosure provide a method for processing image, including: images in an initial dataset are preprocessed to obtain a training dataset;
   an image segmentation neural network is trained by the training dataset;
   a last loss function layer of a trained image segmentation neural network is removed to obtain an inference network;
   the training dataset is inputted into the inference network to obtain a plurality of logical vectors;
   a check network is trained on a basis of the plurality of the logical vectors, the initial dataset, and a mask of each of the images in the initial dataset; and
   inference is performed on an image to be processed by the inference network and a trained check network so as to obtain the mask of the image to be processed.

In some embodiments, the images in the initial dataset are preprocessed to obtain the training dataset further includes:
   each of the images in the initial dataset is segmented to obtain a plurality of sub-images corresponding to each of the images, and a first dataset is constructed by the plurality of the sub-images which are segmented from each of the images, and an element in the first dataset is the plurality of the sub-images of one of the images in the initial dataset;
   each of the images in the initial dataset is reduced to obtain reduced images, and a second dataset is constructed by the reduced images, and a size of the reduced image is the same as a size of the sub-image; and
   each element in the first dataset is combined with a corresponding element in the second dataset to obtain each element in the training dataset.

In some embodiments, the method further includes:
   a label of each of the images in the initial dataset is segmented to obtain a plurality of sub-labels corresponding to the label of each of the images, and each of the plurality of the sub-labels corresponds to one corresponding sub-image; and
   the label of each of the images in the initial dataset is reduced to obtain a reduced label.

In some embodiments, each of the images in an initial dataset is segmented to obtain the plurality of the sub-images corresponding to each of the images further includes:
   a set segmentation scale is acquired and it is determined whether the segmentation scale is divisible;
   in response to indivisibility, modular operation is performed on the segmentation scale and edges of the image are supplemented;
   or, in response to divisibility, the image is equally segmented by the segmentation scale.

In some embodiments, the check network is trained on the basis of the logical vectors, the initial dataset, and the mask of each of the images in the initial dataset further includes:
   a multilayer perceptron is constructed;
   the multilayer perceptron is trained by the plurality of the logical vectors, the initial dataset, and the mask of each of the images in the initial dataset; and in response to a loss value of the multilayer perceptron not decreasing after a preset number of training iterations, it is determined that the multilayer perceptron is trained to convergence.

In some embodiments, the method further includes: the multilayer perceptron is trained by a loss function $$\text{Loss} = -\frac{1}{N}\sum_i\sum_{c=1}^{M} y_{ic}\log(p_{ic});$$

and N is the number of classified categories, i is an ith category therein, and has a value range of 1, 2, ..., N; M is the total number of samples, c is a cth sample therein, and has a value range of 1, 2, ..., M; yic is a real probability of the cth sample actually belonging to the ith category, and in a case that a category to which the cth sample actually belongs is i, the probability is 1, in a case that the category to which the cth sample actually belongs is not i, the probability is 0; and Pic is a probability of the cth sample being predicted as the ith category.

In some embodiments, the inference is performed on the image to be processed by the inference network and the trained check network so as to obtain the mask of the image to be processed further includes:

the preprocessing is performed on the image to be processed;

the preprocessed image to be processed is inputted into the inference network to obtain a logical vector corresponding to the preprocessed image to be processed; and the logical vector corresponding to the preprocessed image to be processed is inputted into the trained check network for inference so as to obtain the mask of the image to be processed.

On the basis of the same inventive concept, according to another aspect of the present disclosure, the embodiments of the present disclosure further provide a system for processing image, including:

a preprocessing component, configured to preprocess images in an initial dataset to obtain a training dataset;

a first training component, configured to train an image segmentation neural network by the training dataset;

a segmentation component, configured to remove a last loss function layer of a trained image segmentation neural network to obtain an inference network;

an input component, configured to input the training dataset into the inference network to obtain a plurality of logical vectors;

a second training component, configured to train a check network on a basis of the plurality of the logical vectors, the initial dataset, and a mask of each of the images in the initial dataset; and an inference component, configured to perform inference on an image to be processed by the inference network and a trained check network so as to obtain the mask of the image to be processed.

On the basis of the same inventive concept, according to another aspect of the present disclosure, the embodiments of the present disclosure further provide a computer device, including:

at least one processor; and a memory storing computer readable instructions executable on the at least one processor, and the at least one processor executes steps of the method for processing the image according to any one of the described embodiments when executing the computer readable instructions.

On the basis of the same inventive concept, according to another aspect of the present disclosure, the embodiments of the present disclosure further provide one or more non-transitory computer readable storage medium storing computer readable instructions which, when executed by one or more processors, cause the one or more processors to execute steps of the method for processing the image according to any one of the described embodiments.

Details of one or more embodiments of the present disclosure are set forth in the drawings and the description below. Other features and advantages of the present disclosure will become apparent from the description, the drawings, and the claims.

BRIEF DESCRIPTION OF THE DRAWINGS

To describe the technical solutions in the embodiments of the present disclosure or in the prior art more clearly, the following briefly introduces the drawings required for describing the embodiments or the prior art. Apparently, the drawings in the following description show merely some embodiments of the present disclosure, and a person of ordinary skill in the art may still derive other embodiments from these drawings without inventive efforts.

DETAILED DESCRIPTION OF THE EMBODIMENTS

In order to make the objectives, technical solutions and advantages of the present disclosure more clearer, the embodiments of the present application will be further described in detail below in conjunction with specific embodiments and with reference to the drawings.

It should be noted that, in the embodiments of the present disclosure, all expressions using "first" and "second" are used to distinguish two different entities or different parameters having the same name. Therefore, "first" and "second" are only for convenience of description, and should not be understood as limitations to the embodiments of the present disclosure, and it will not be described one by one in subsequent embodiments.

Figure 1:
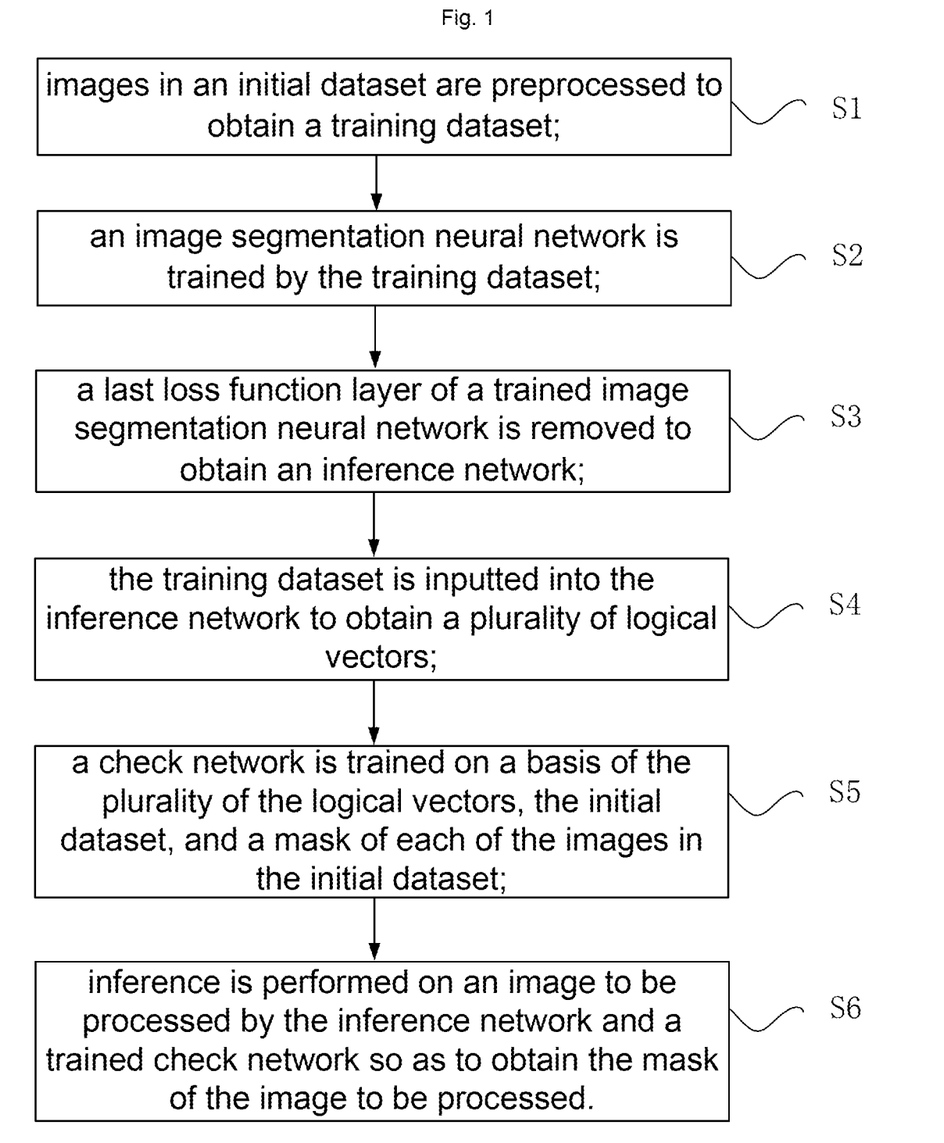
FIG. 1 is a schematic flowchart of a method for processing image according to one or more embodiments of the present disclosure.

According to one aspect of the present disclosure, the embodiments of the present disclosure provide a method for processing image. As shown in FIG. 1, the method may include the following steps:

S1: images in an initial dataset are preprocessed to obtain a training dataset;

S2: an image segmentation neural network is trained by the training dataset;

S3: a last loss function layer of a trained image segmentation neural network is removed to obtain an inference network;

S4: the training dataset is inputted into the inference network to obtain a plurality of logical vectors;

S5: a check network is trained on a basis of the plurality of the logical vectors, the initial dataset, and a mask of each of the images in the initial dataset; and S6: inference is performed on an image to be processed by the inference network and a trained check network so as to obtain the mask of the image to be processed.

The present disclosure provides a solution for the case of memory overflows during large-scale image segmentation network training for high-resolution images to reduce the video memory required for the network training while ensuring the accuracy of image segmentation when the computation power is limited. In addition, the post-correction does not depend on the weights and parameters of the segmentation network, and the post-correction can be directly performed on any pre-trained check network, so as to realize the processing of high-resolution images by any check network without re-training the check network, thereby greatly reducing the development costs, and improving the adaptability of different check networks to high-resolution images.

In some embodiments, the step S1: the images in the initial dataset are preprocessed to obtain the training dataset further includes:

each of the images in the initial dataset is segmented to obtain a plurality of sub-images corresponding to each of the images, and a first dataset is constructed by the plurality of the sub-images which are segmented from each of the images, and an element in the first dataset is the plurality of the sub-images of one of the images in the initial dataset;

each of the images in the initial dataset is reduced to obtain reduced images, and a second dataset is constructed by the reduced image, and a size of the reduced image is the same as a size of the sub-image; and each element in the first dataset is combined with a corresponding element in the second dataset to obtain each element in the training dataset.

In some embodiments, the method further includes:

a label of each of the images in the initial dataset is segmented to obtain a plurality of sub-labels corresponding to the label of each of the images, and each of the plurality of the sub-labels corresponds to one corresponding sub-image; and the label of each of the images in the initial dataset is reduced to obtain a reduced label.

In some embodiments, each of the images in the initial dataset is segmented to obtain the plurality of the sub-images corresponding to each of the images further includes:

a set segmentation scale is acquired and it is determined whether the segmentation scale is divisible;

in response to indivisibility, modular operation is performed on the segmentation scale and edges of the image are supplemented;

or, in response to divisibility, the image is equally segmented by the segmentation scale. In some embodiments, for any high-resolution image $I_0$ having M*N pixel points in the initial dataset Dataset0, the image $I_0$ is segmented first, and the specific segmentation ratio may differ according to different scales of image segmentation networks, for example, the ratio of 1:2 can be used for equal segmentation, i.e. cutting off in the middle in both the length and width directions, one high-resolution image is segmented into 2*2=4 low-resolution images ($I_1$, $I_2$, $I_3$, $I_4$) with M/2*N/2, the same processing is performed on the label image corresponding to the image, so as to ensure that label files ($M_1$, $M_2$, $M_3$, $M_4$) correspond to image data on a one-to-one basis, and a dataset after all the images are segmented is referred to as the first dataset (Dataset1). Thereafter, the image $I_0$ is reduced, the size after reducing is consistent with the size of the segmented image, this image is denoted as Is, a label file $M_5$ is obtained by means of the same method, and a dataset after all the images are reduced is referred to as a second dataset (Dataset2). The first dataset and the second dataset are mixed as the training dataset, i.e. each element in the training dataset is an element of the first dataset and an element of the second dataset, for example, with regard to the image $I_0$, the corresponding element in the training dataset is ($I_1$, $I_2$, $I_3$, $I_4$, $I_5$), and the corresponding label is ($M_1$, $M_2$, $M_3$, $M_4$, $M_5$).

In some embodiments, in step S2, the image segmentation neural network is trained by the training dataset, specifically, in training process of the image segmentation neural network, a preprocessed dataset is used to perform a normal training flow, and in a case that a certain accuracy requirement or number of training times is satisfied, the training is stopped, and a hyper-network weight when the training is finished is acquired.

In some embodiments, the image segmentation neural network may adopt a plurality of neural network structures, for example, a neural network manually designed by means of Mask RCNN, DeepLab series algorithms, etc., and a neural network architecture search method may also be used to obtain a neural network.

Figure 2:
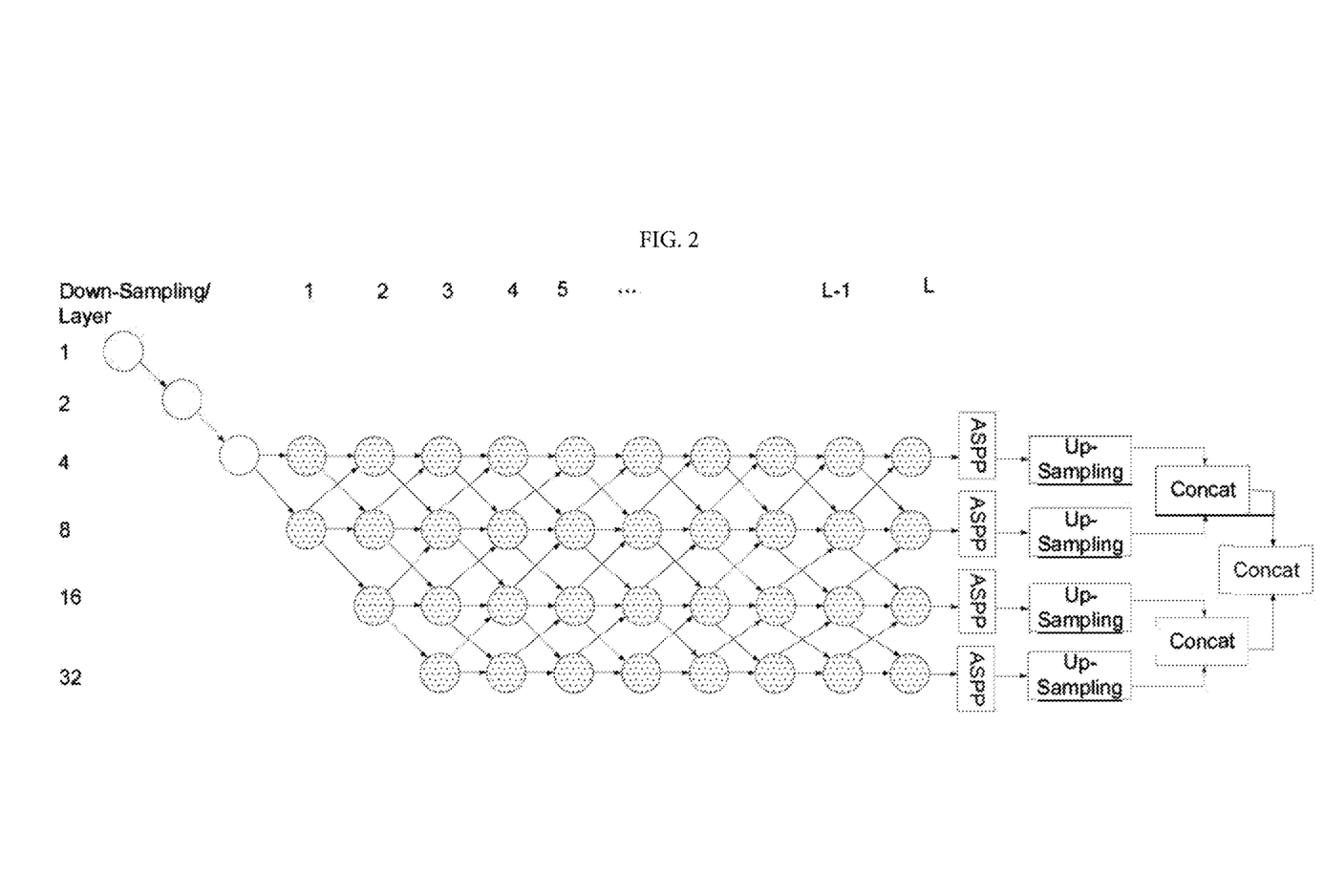
FIG. 2 is a schematic structural diagram of an image segmentation neural network based on neural network architecture search according to one or more embodiments of the present disclosure.

In some embodiments, the structure of the image segmentation neural network based on neural network architecture search may be as shown in FIG. 2. A hyper-network based on neural network architecture search may be defined to contain L=12 cells, each cell is a directed acyclic graph containing B blocks, each block contains two branch structures, and mapping is performed from two input vectors to one output vector. The ith block of the first layer of cells may be defined as (Input1, Input2, $O_1$, $O_2$, C), and Input1, Input2∈$I_i^l$, which is an input vector selected by the block; $O_1$, $O_2$∈O, which is a type of a layer that is selected by the block to perform an operation on an input vector; and C∈C, which is the operation needed to combine outputs of two independent branches to construct an output vector $H_i^l$ of the block. The output $H^l$ of the current WHY, cell is formed by splicing output vectors $\{H_1^l, \ldots, H_B^l\}$ of respective blocks. The set of input vectors contains the output $H^{l-1}$ of the preceding layer of cells, the output $H^{l-2}$ the previous two times, and the outputs $\{H_1^l, \ldots, H_1^l\}$ of preceding blocks in the same cell.

Search space O used by each cell includes the following eight operations: 3*3 depthwise separable convolution; 5*5 depthwise separable convolution; 3*3 atrous convolution rate=2; 5*5 atrous convolution rate=2; 3*3 average pooling; 3*3 max pooling; skip connection; and zero operation. C adopts a simple pixel point addition method.

The neural network obtained by the neural network architecture search method as shown in FIG. 2 is composed of two fixed feature extraction layers and subsequent 12 layers of cells. Each of the two fixed layers reduces the spatial resolution by 2 (i.e. down-sampling by a factor of 2), and the subsequent L layers of cells have an unknown spatial resolution, with the highest being down-sampling by a factor of 4 and the lowest being down-sampling by a factor of 32. As the spatial resolution difference of each layer is a factor of 2, the first cell can perform down-sampling on the original input image by factors of 4 and 8, the second cell can perform down-sampling on the original input image by factors of 4, 8 and 16, and the third to twelfth cells can perform down-sampling on the original input image by factors of 4, 8, 16 and 32. FIG. 2 shows the search space of the hyper-network based on neural network structure search at the network architecture level.

An atrous spatial pyramid pooling (ASPP) component is added to each spatial resolution feature after the Lth layer of cells, up-sampling is performed on an output thereof by a bilinear interpolation method to restore the resolution of the input image, and results are added to obtain a prediction result.

In other embodiments of the present disclosure, the up-sampling method can also be selected from bilinear quadratic interpolation, cubic curve interpolation, minimum curvature interpolation, radial basis function method, etc.

In some embodiments, in step S3, the last loss function layer of the trained image segmentation neural network is removed to obtain the inference network, specifically, in the image segmentation neural network, the last loss function layer of a classifier part of the segmentation network needs to be removed, and the network output is changed from segmented pixel points having different category values to logit values of the pixel points of different categories. For example, the feature extraction network, i.e. the architecture search part in FIG. 1, may also adopt other segmentation network architectures in other embodiments. The forward inference network uses the trained weight in S2, pops up the weight of the last layer, and outputs a vector T after the Concat layer.

In some embodiments, in step S4, the training dataset is inputted into the inference network to obtain the plurality of the logical vectors, specifically, Dataset1 and Dataset2 may be used as input data to perform forward inference in the image segmentation neural network. Input images are <I1, I2, I3, I4, I5> and output vectors T are <T1, T2, T3, T4, T5>.

In some embodiments, the check network is trained on the basis of the logical vectors, the initial dataset, and the mask of each of the images in the initial dataset further includes:
  a multilayer perceptron is constructed;
  the multilayer perceptron is trained by the plurality of the logical vectors, the initial dataset, and the mask of each of the images in the initial dataset; and
  in response to a loss value of the multilayer perceptron not decreasing after a preset number of training iterations, it is determined that the multilayer perceptron is trained to convergence.

In some embodiments, a forward inference vector is used as input data, and masks of a Dataset0 is used as a label, for an image $I_0$ in the Dataset0, the mask thereof is $M_0$, and there is a certain mapping relationship f between <T1, T2, T3, T4, T5> and $I_0$, which satisfies:

$$M0 = f(T1, T2, T3, T4, T5)$$

In this way, after the check network is trained by the logical vectors, the initial dataset, and the mask of each of the images in the initial dataset, the mapping relationship f can be obtained, so as to perform inference on the image to be processed.

Figure 3:
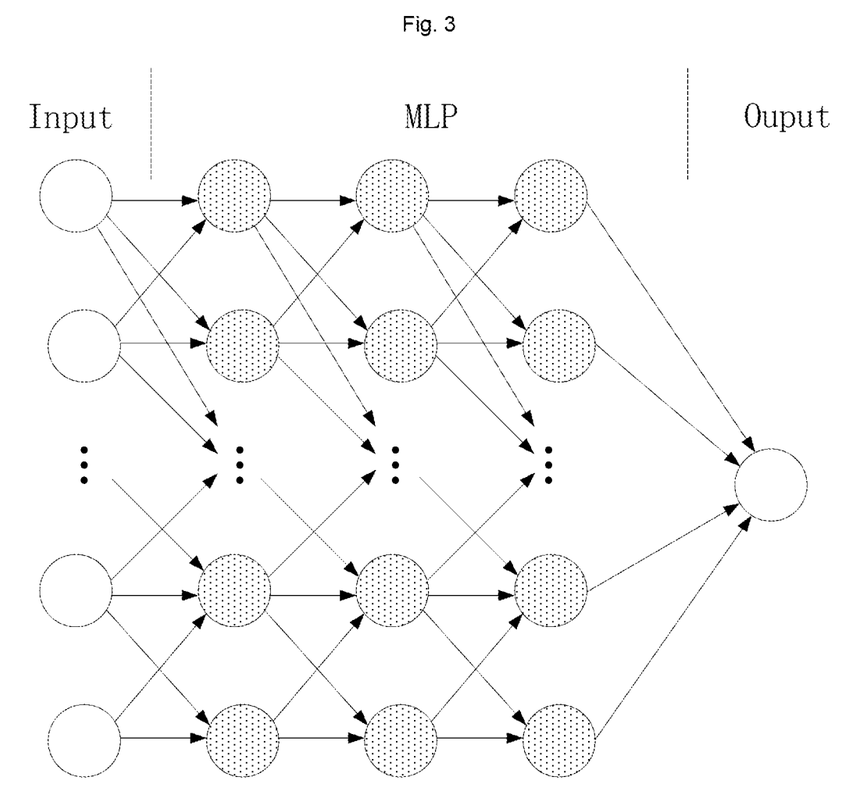
FIG. 3 is a schematic structural diagram of a multilayer perceptron according to one or more embodiments of the present disclosure.

In some embodiments, the structure of the constructed multilayer perceptron may be as shown in FIG. 3. The multilayer perceptron (MLP) is a feedforward artificial neural network model, and maps a plurality of input datasets to a single output dataset. As a post-check network, training is continued until the network converges, and a condition for evaluating convergence may be that the loss does not decrease after five training iterations.

In some embodiments, the method further includes:
  the multilayer perceptron is trained by a loss function $$\text{Loss} = -\frac{1}{N}\sum_{i}\sum_{c=1}^{M} y_{ic}\log(p_{ic});$$

and N is the number of classified categories, i is an ith category therein, and has a value range of 1, 2, . . . , N; M is the total number of samples, c is a cth sample therein, and has a value range of 1, 2, . . . , M; yic is a real probability of the cth sample actually belonging to the ith category, and in a case that a category to which the cth sample actually belongs is i, the probability is 1, in a case that the category to which the cth sample actually belongs is not i, the probability is 0; and Pic is a probability of the cth sample being predicted as the ith category.

In some embodiments, the inference is performed on the image to be processed by the inference network and the trained check network so as to obtain the mask of the image to be processed further includes:
  the preprocessing is performed on the image to be processed;
  the preprocessed image to be processed is inputted into the inference network to obtain a logical vector corresponding to the preprocessed image to be processed; and
  the logical vector corresponding to the preprocessed image to be processed is inputted into the trained check network for inference so as to obtain the mask of the image to be processed.

In some embodiments, when the inference is performed on the image to be processed by the inference network and the trained check network, a preprocessing process (the same as S1) may be performed on a high-resolution image first to obtain a Dataset1 and a Dataset2, and then the Dataset1 and the Dataset2 are used as input data to acquire an output vector T in the forward inference network. Finally, the vector T is inputted, the trained multilayer perceptron is used to acquire a final predicted mask of image segmentation.

The present disclosure provides a solution for the case of memory overflows during large-scale image segmentation network training for high-resolution images to reduce the video memory required for the network training while ensuring the accuracy of image segmentation when the computation power is limited. In addition, the post-correction does not depend on the weights and parameters of the segmentation network, and the post-correction can be directly performed on any pre-trained check network, so as to realize the processing of high-resolution images by any check network without re-training the check network, thereby greatly reducing the development costs, and improving the adaptability of different check networks to high-resolution images.

Figure 4:
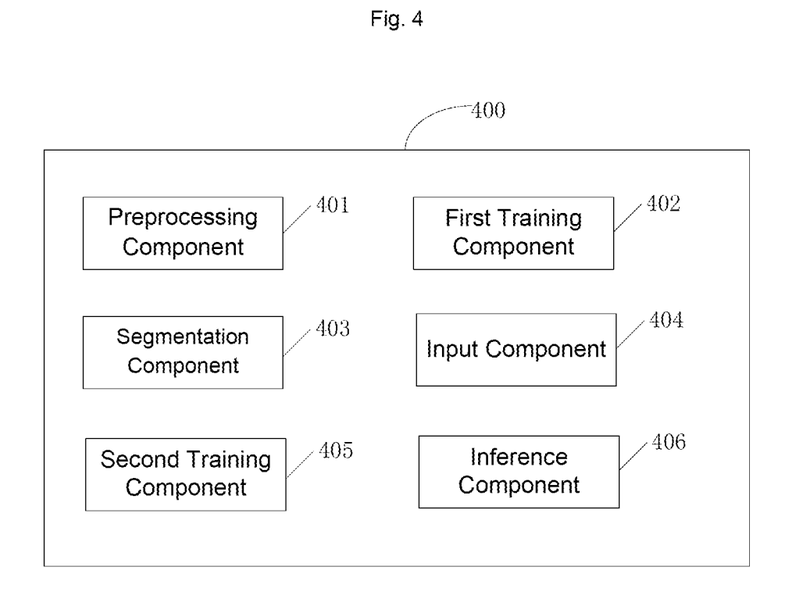
FIG. 4 is a schematic structural diagram of a system for processing image according to one or more embodiments of the present disclosure.

On the basis of the same inventive concept, according to another aspect of the present disclosure, the embodiments of the present disclosure further provide a system for processing image 400. As shown in FIG. 4, the image processing system 400 includes:

- a preprocessing component 401, configured to preprocess images in an initial dataset to obtain a training dataset;
- a first training component 402, configured to train an image segmentation neural network by the training dataset;
- a segmentation component 403, configured to remove a last loss function layer of a trained image segmentation neural network to obtain an inference network;
- an input component 404, configured to input the training dataset into the inference network to obtain a plurality of logical vectors;
- a second training component 405, configured to train a check network on a basis of the plurality of the logical vectors, the initial dataset, and a mask of each of the images in the initial dataset; and
- an inference component 406, configured to perform inference on an image to be processed by the inference network and a trained check network so as to obtain the mask of the image to be processed.

In some embodiments, the images in the initial dataset are preprocessed to obtain the training dataset further includes:

- each of the images in the initial dataset is segmented to obtain a plurality of sub-images corresponding to each of the images, and a first dataset is constructed by the plurality of the sub-images which are segmented from each of the images, and an element in the first dataset is the plurality of the sub-images of one of the images in the initial dataset;
- each of the images in the initial dataset is reduced to obtain reduced images, and a second dataset is constructed by the reduced image, and a size of the reduced image is the same as a size of the sub-image; and
- each element in the first dataset is combined with a corresponding element in the second dataset to obtain each element in the training dataset.

In some embodiments, the system further includes:

- a label of each of the images in the initial dataset is segmented to obtain a plurality of sub-labels corresponding to the label of each of the images, and each of the plurality of the sub-labels corresponds to one corresponding sub-image; and
- the label of each of the images in the initial dataset is reduced to obtain a reduced label.

In some embodiments, each of the images in the initial dataset is segmented to obtain the plurality of the sub-images corresponding to each of the images further includes:

- a set segmentation scale is acquired and it is determined whether the segmentation scale is divisible;
- in response to indivisibility, modular operation is performed on the segmentation scale and edges of the image are supplemented;
- or, in response to divisibility, the image is equally segmented by the segmentation scale.

In some embodiments, the check network is trained on the basis of the logical vectors, the initial dataset, and the mask of each of the images in the initial dataset further includes:

- a multilayer perceptron is constructed;
- the multilayer perceptron is trained by the plurality of the logical vectors, the initial dataset, and the mask of each of the images in the initial dataset; and
- in response to a loss value of the multilayer perceptron not decreasing after a preset number of training iterations, it is determined that the multilayer perceptron is trained to convergence.

In some embodiments, the system further includes:
the multilayer perception is trained by a loss function $$\text{Loss} = -\frac{1}{N}\sum_{i}\sum_{c=1}^{M} y_{ic}\log(p_{ic});$$

and N is the number of classified categories, i is an ith category therein, and has a value range of 1, 2, ..., N; M is the total number of samples, c is a cth sample therein, and has a value range of 1, 2, ..., M; yic is a real probability of the cth sample actually belonging to the ith category, and in a case that a category to which the cth sample actually belongs is i, the probability is 1, in a case that the category to which the cth sample actually belongs is not i, the probability is 0; and Pic is a probability of the cth sample being predicted as the ith category.

In some embodiments, the inference is performed on the image to be processed by the inference network and the trained check network so as to obtain the mask of the image to be processed further includes:

- the preprocessing is performed on the image to be processed;
- the preprocessed image to be processed is inputted into the inference network to obtain a logical vector corresponding to the preprocessed image to be processed; and
- the logical vector corresponding to the preprocessed image to be processed is inputted into the trained check network for inference so as to obtain the mask of the image to be processed.

The present disclosure provides a solution for the case of memory overflows during large-scale image segmentation network training for high-resolution images to reduce the video memory required for the network training while ensuring the accuracy of image segmentation when the computation power is limited. In addition, the post-correction does not depend on the weights and parameters of the segmentation network, and the post-correction can be directly performed on any pre-trained check network, so as to realize the processing of high-resolution images by any check network without re-training the check network, thereby greatly reducing the development costs, and improving the adaptability of different check networks to high-resolution images.

Figure 5:
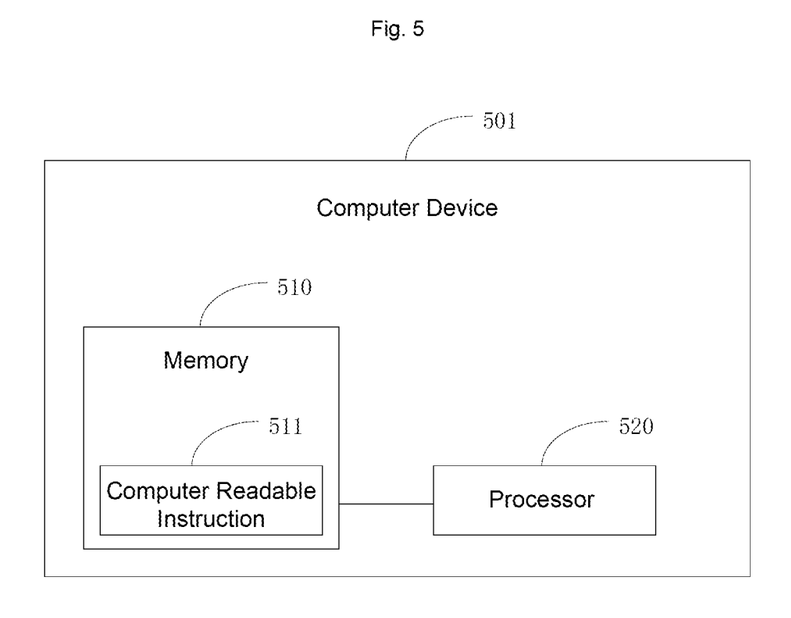
FIG. 5 is a schematic structural diagram of a computer device according to one or more embodiments of the present disclosure.

On the basis of the same inventive concept, according to another aspect of the present disclosure, as shown in FIG. 5, the embodiments of the present disclosure further provide a computer device 501, including:

- at least one processor 520; and
- a memory 510 storing computer readable instructions 511 executable on the at least one processor, and the at least one processor 520 executes the steps of the method for processing the image according to any one of the described embodiments when executing the computer readable instructions 511.

Figure 6:
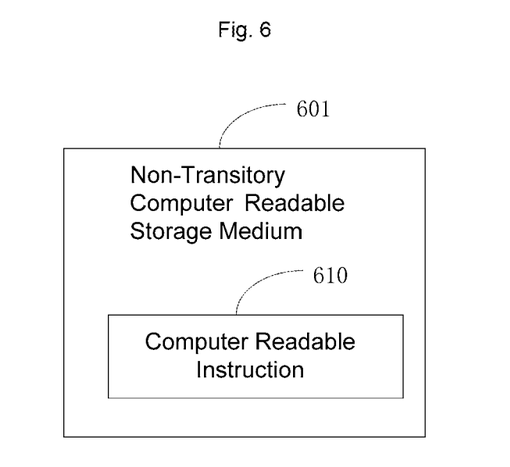
FIG. 6 is a schematic structural diagram of a non-transitory computer readable storage medium according to one or more embodiments of the present disclosure.

On the basis of the same inventive concept, according to another aspect of the present disclosure, as shown in FIG. 6, the embodiments of the present disclosure further provide one or more non-transitory computer readable storage medium 601 storing computer readable instructions 610 which, when executed by one or more processors, cause the one or more processors to execute the steps of the method for processing the image according to any one of the described embodiments.

Finally, it should be noted that a person of ordinary skill in the art may understand that all or some of the processes of the method in the described embodiments may be implemented by instructing relevant hardware by means of computer readable instructions. The computer readable instructions may be stored in a non-transitory computer readable storage medium. When the computer readable instructions are executed, the processes of the method in the described embodiments may be included.

A person skilled in the art would further appreciate that the various illustrative logical blocks, components, circuits, and algorithm steps described in combination with the disclosure herein may be implemented as electronic hardware, computer software, or combinations of both. To clearly illustrate this interchangeability of hardware and software, various illustrative components, blocks, components, circuits, and steps have been described generally in terms of their functions. Whether such functions are implemented as software or hardware depends on the specific application and design constraints imposed on the overall system. A person skilled in the art may implement functions in various manners for each specific application, but such implementation decisions should not be interpreted as causing a departure from the scope of disclosure of the embodiments of the present disclosure.

The above are exemplary embodiments disclosed in the present disclosure, but it should be noted that various changes and modifications can be made without departing from the scope of disclosure of the embodiments of the present disclosure as defined in the claims. The functions, steps and/or actions of the method claims in accordance with the disclosed embodiments described herein are not necessarily performed in any particular order. In addition, although elements disclosed in the embodiments herein may be described or claimed in an individual form, unless explicitly limited to a singular number, the elements may be understood as multiple.

It should be understood that, as used herein, the singular forms "a" and "an" are intended to include the plural form as well, unless the context clearly supports the exceptional case. It should also be understood that "and/or" as used herein refers to any and all possible combinations including one or more of the items listed in association.

The serial numbers of the embodiments disclosed in the embodiments of the present disclosure are only for description, and do not represent the preference of the embodiments.

A person of ordinary skill in the art may understand that all or some of the steps in the described embodiments may be implemented by hardware or by instructing relevant hardware by means of programs. The programs may be stored in a computer readable storage medium. The storage medium may be a read-only memory, a magnetic disk, or an optical disk, etc.

A person of ordinary skill in the art should understand that the discussion of any of the described embodiments is merely exemplary and is not intended to imply that the scope of disclosure of the embodiments of the present disclosure (including the claims) is limited to these examples. Under the concept of the embodiments of the present disclosure, the technical features in the described embodiments or different embodiments may also be combined, and there are many other variations in different aspects from the described embodiments of the present disclosure, which are not provided in details for simplicity. Therefore, any omissions, modifications, equivalent replacements, improvements and the like made within the spirit and principle of the embodiments of the present disclosure shall belong to the scope of protection of the embodiments of the present disclosure.

What is claimed is:

1. A method for processing image, comprising:
   preprocessing images in an initial dataset to obtain a training dataset;
   training an image segmentation neural network by the training dataset;
   removing a last loss function layer of a trained image segmentation neural network to obtain an inference network;
   inputting the training dataset into the inference network to obtain a plurality of logical vectors;
   training a check network on a basis of the plurality of the logical vectors, the initial dataset, and a mask of each of the images in the initial dataset; and
   performing inference on an image to be processed by the inference network and a trained check network so as to obtain the mask of the image to be processed.

2. The method according to claim 1, wherein preprocessing the images in the initial dataset to obtain the training dataset further comprises:
   segmenting each of the images in the initial dataset to obtain a plurality of sub-images corresponding to each of the images, and constructing a first dataset by the plurality of the sub-images which are segmented from each of the images, wherein an element in the first dataset is the plurality of the sub-images of one of the images in the initial dataset;
   reducing each of the images in the initial dataset to obtain reduced images, and constructing a second dataset by the reduced images, wherein a size of the reduced image is the same as a size of the sub-image; and
   combining each element in the first dataset with a corresponding element in the second dataset to obtain each element in the training dataset.

3. The method according to claim 2, further comprising:
   segmenting a label of each of the images in the initial dataset to obtain a plurality of sub-labels corresponding to the label of each of the images, wherein each of the plurality of the sub-labels corresponds to one corresponding sub-image; and
   reducing the label of each of the images in the initial dataset to obtain a reduced label.

4. The method according to claim 3, wherein segmenting each of the images in the initial dataset to obtain the plurality of the sub-images corresponding to each of the images comprises:
   using a ratio for equal segmenting each of the images in the initial dataset to obtain the plurality of the sub-images corresponding to each of the images.

5. The method according to claim 2, wherein segmenting each of the images in the initial dataset to obtain the plurality of the sub-images corresponding to each of the images further comprises:
   acquiring a set segmentation scale and determining whether the segmentation scale is divisible; and
   in response to indivisibility, performing modular operation on the segmentation scale and supplementing edges of the image; or, in response to divisibility, equally segmenting the image by the segmentation scale.

6. The method according to claim 2, wherein inputting the training dataset into the inference network to obtain the plurality of the logical vectors comprises:

using the first dataset and the second dataset as input data to perform forward inference in the image segmentation neural network.

7. The method according to claim 1, wherein training the check network on the basis of the logical vectors, the initial dataset, and the mask of each of the images in the initial dataset further comprises:
constructing a multilayer perceptron;
training the multilayer perceptron by the plurality of the logical vectors, the initial dataset, and the mask of each of the images in the initial dataset; and
in response to a loss value of the multilayer perceptron not decreasing after a preset number of training iterations, determining that the multilayer perceptron is trained to convergence.

8. The method according to claim 7, further comprising:
training the multilayer perceptron by a loss function;

$$Loss = -\frac{1}{N}\sum_i \sum_{c=1}^{M} y_{ic} \log(p_{ic})$$

wherein N is the number of classified categories, i is an ith category therein, and has a value range of 1, 2, ..., N; M is the total number of samples, c is a cth sample therein, and has a value range of 1, 2, ..., M; yic is a real probability of the cth sample actually belonging to the ith category, wherein in a case that a category to which the cth sample actually belongs is i, the probability is 1, in a case that the category to which the cth sample actually belongs is not i, the probability is 0; and Pic is a probability of the cth sample being predicted as the ith category.

9. The method according to claim 7, wherein training the multilayer perceptron by the plurality of the logical vectors, the initial dataset, and the mask of each of the images in the initial dataset comprises:
training the multilayer perceptron by the plurality of the logical vectors, the initial dataset, and the mask of each of the images in the initial dataset to obtain a mapping relationship between the logical vector and the image in the initial dataset.

10. The method according to claim 1, wherein performing the inference on the image to be processed by the inference network and the trained check network so as to obtain the mask of the image to be processed further comprises:
performing the preprocessing on the image to be processed;
inputting the preprocessed image to be processed into the inference network to obtain a logical vector corresponding to the preprocessed image to be processed; and
inputting the logical vector corresponding to the preprocessed image to be processed into the trained check network for inference so as to obtain the mask of the image to be processed.

11. The method according to claim 1, wherein training the image segmentation neural network by the training dataset comprises:
training the image segmentation neural network by the training dataset; and
in a case that a certain accuracy requirement or number of training times is satisfied, stopping the training, and acquiring a hyper-network weight.

12. The method according to claim 1, wherein the image segmentation neural network comprises at least one of following: Mask RCNN, DeepLab, a neural network obtained by a neural network architecture search method.

13. The method according to claim 12, wherein a hyper-network based on the neural network architecture search method is defined to contain 12 cells, each cell is a directed acyclic graph containing B blocks, each block contains two branch structures, and mapping is performed from two input vectors to one output vector.

14. The method according to claim 13, wherein the ith block of a first layer of the cells is defined as (Input1, Input2, $O_1$, $O_2$, C), and Input1, Input2 $\in I_i^l$, which is an input vector selected by the block; $O_1$, $O_2 \in O$, which is a type of a layer that is selected by the block to perform an operation on an input vector; and C $\in$ C, which is the operation needed to combine outputs of two independent branches to construct the output vector HP of the block.

15. The method according to claim 14, wherein search space O used by each cell comprises following eight operations: 3*3 depthwise separable convolution; 5*5 depthwise separable convolution; 3*3 atrous convolution rate=2; 5*5 atrous convolution rate=2; 3*3 average pooling; 3*3 max pooling; skip connection; and zero operation.

16. The method according to claim 13, wherein a first cell performs down-sampling on an original input image by factors of 4 and 8, a second cell performs down-sampling on the original input image by factors of 4, 8 and 16, and third to twelfth cells perform down-sampling on the original input image by factors of 4, 8, 16 and 32.

17. The method according to claim 16, wherein segmenting the label of each of the images in the initial dataset to obtain the plurality of the sub-labels corresponding to the label of each of the images comprises:
using the ratio for equal segmenting the label of each of the images in the initial dataset to obtain the plurality of the sub-labels corresponding to the label of each of the images.

18. The method according to claim 1, wherein removing the last loss function layer of the trained image segmentation neural network to obtain the inference network comprise:
removing the last loss function layer of a classifier part of the image segmentation neural network;
changing the network output from segmented pixel points having different category values to logit values of the pixel points of different categories.

19. A computer device, comprising:
at least one processor; and
a memory storing computer readable instructions executable on the at least one processor, wherein when executing the computer readable instructions, the computer readable instructions cause the at least one processor to:
preprocess images in an initial dataset to obtain a training dataset;
train an image segmentation neural network by the training dataset;
remove a last loss function layer of a trained image segmentation neural network to obtain an inference network;
input the training dataset into the inference network to obtain a plurality of logical vectors;
train a check network on a basis of the plurality of the logical vectors, the initial dataset, and a mask of each of the images in the initial dataset; and
perform inference on an image to be processed by the inference network and a trained check network so as to obtain the mask of the image to be processed.

20. One or more non-transitory computer readable storage medium storing computer readable instructions which, when executed by one or more processors, cause the one or more processors to:
preprocess images in an initial dataset to obtain a training dataset;
train an image segmentation neural network by the training dataset;
remove a last loss function layer of a trained image segmentation neural network to obtain an inference network;
input the training dataset into the inference network to obtain a plurality of logical vectors;
train a check network on a basis of the plurality of the logical vectors, the initial dataset, and a mask of each of the images in the initial dataset; and
perform inference on an image to be processed by the inference network and a trained check network so as to obtain the mask of the image to be processed.

* * * * *